Patented Apr. 26, 1938

2,115,240

UNITED STATES PATENT OFFICE 2,115,240

COMPOSITION OF MATTER

Oswald Sturken, Closter, N. J., assignor, by mesne assignments, to Corn Products Refining Company, New York, N. Y., a corporation of New Jersey No Drawing. Application September 23, 1935, Serial No. 41,777

4 Claims. (Cl. 134—23.8)

My invention relates to improved zein adhesives and, more particularly, to zein adhesives having improved adhesion to non-fibrous surfaces and having increased working time.

In my copending application Ser. No. 41,776 filed September 23, 1935 I have disclosed a new type of adhesive comprising a solution of zein in an aqueous organic solvent mixture containing a methylene compound. Such adhesives generally have various advantages over previously known materials. However, I have now discovered that adhesives of this type may be further improved for certain purposes by incorporating a lower aliphatic acid into the mixture. The resulting materials will be found to have substantially increased working time and to have improved adhesion for non-fibrous surfaces. The acid stabilizes the solution, that is, it prevents the formation of denatured insoluble compounds which cause a jellying of the solution.

According to the procedure of my copending application referred to above, the adhesives are prepared by adding a solution of the methylene compound to the solution of zein in the aqueous organic solvent mixture. For example, from 15–25% of free formaldehyde in the form of commercial 40% aqueous formaldehyde is added to a solution of zein in 95% ethyl alcohol. According to my present process, a lower aliphatic acid such as acetic acid may be incorporated at any stage of the process. The zein may first be moistened with the acid before adding the alcohol or other organic solvent, or, alternately, the acid may be added to the zein solution either before or after the addition of the methylene compound. The acid may be added in any suitable form such as in aqueous solution or as the anhydride. In general, I prefer to utilize concentrated aqueous solutions such as glacial acetic acid. It should be borne in mind that sufficient water should not be added in the acid solution to precipitate the zein from the organic solvent solution. The final water concentration should be 30% or less in the case of ethyl alcohol and should be maintained safely below the solubility tolerance limit for any solvent employed. However, from the standpoint of preventing the formation of insoluble gels, it is desirable to maintain the water content as low as possible, and for this reason I prefer to employ 95% alcohol with the minimum possible dilution on addition of the acid and formaldehyde.

The amount of acid to be added will depend upon the particular use for which the product is intended. For example, I have found that approximately 2% of acetic acid, based on the weight of the zein, will increase the working time of the product approximately 400%. However, to secure suitable adhesion to smooth surfaces such as glass, I have found that 10% or more of acetic acid is desirable. Amounts of acid up to 100% of the weight of the zein may be satisfactorily employed in certain cases. In general, I prefer to utilize from 2% to 15% of acetic acid or corresponding amounts of other lower aliphatic acids for stabilizing purposes and improved adhesion.

Adhesives prepared in the above manner may be employed for practically any of the usual purposes. For example, an adhesive containing 2% of acetic acid will be found to be practically equivalent to a casein adhesive as far as strength of bond, and ease of application are concerned. However, such adhesives, when fully cured, have substantially better water resistance than the casein products and have an additional advantage in their lesser tendency to stain light woods or other light-colored materials. Their greatly increased working time constitutes a further advantage over the casein products.

The adhesives containing increased amounts of acid, e. g. of the order of 10%, are particularly adapted for bonding non-fibrous surfaces such as glass or the like. The ability to bond such surfaces and the extreme water resistance of the products makes them especially suited for use in the production of laminated glass. For this purpose, the adhesives may be used alone, in which case a layer having a thickness of the order of 0.01 inch should be employed, or the adhesive may be employed in considerably thinner layers to bond the glass laminations to intermediate layers of nitrocellulose, cellulose acetate or the like. The usual methods of application may be employed for producing laminated products of this nature. The concentration of the zein in the solution may be varied to any desired extent depending on the use of the solution. In most cases the concentration of zein will be between 20% and 35% by weight of the solution.

It will be apparent that my adhesives are also applicable to the bonding of various other non-fibrous surfaces such as metals, synthetic resins or the like, or for bonding surfaces of this nature to a fibrous surface such as wood. The adhesives may be applied in any suitable manner, as for example, by the use of brushes, rollers, or scraping knives. The work may be cold pressed or if it is desired to quicken the setting time and secure immediate water-resistance, it may be hot pressed or may be heat treated after cold pressing. If the material is cold pressed, the curing reaction of the formaldehyde with the zein will be found to proceed on storage at atmospheric temperatures, but an extended period of time will be required for a full cure. It is therefore desirable to heat the work during pressing or subject it to heat treatment after cold pressing. Heating for 10–12 hours at 75° C. or for correspondingly shorter or longer periods of time at higher or lower temperatures will secure a complete cure. Temperatures substantially above 100° C. should generally not be employed in view of the deleterious effect of high temperature upon proteins.

The following specific example will further serve to illustrate my invention: Purified zein, substantially free from oil and coloring matter, was dissolved in 2 parts by weight of 95% ethyl alcohol. Approximately 20% of formaldehyde, based on the weight of the zein, was then added in the form of 0.5 part of a 40% aqueous solution of formaldehyde per part of zein. To the resulting solution there was added approximately 10% of acetic acid, based on the weight of the zein. The resulting solution was found to have a suitable consistency for adhesive use, and after standing for a period of four days it was still in a satisfactory condition for application. When employing this adhesive for the production of laminated glass, 2 sheets of glass were coated with the solution and the product was assembled in the usual manner and pressed at 500 lbs. per sq. in. for approximately 10 hours at 75° C. The product was found to be perfectly clear and to have a strong bond and excellent water resistance.

It is to be understood, of course, that my invention is not to be construed as limited to the particular materials or procedures described above. For example, other alcohol-soluble proteins having the same properties as zein, as for example gliadin, may be regarded as equivalents of zein. Various other solvents such as methyl alcohol, carbitol, cellosolve, diacetone alcohol, ethylene chlorhydrin, and the like may be employed in place of ethyl alcohol. Likewise, other methylene compounds such as paraldehyde might be employed in place of free formaldehyde. By "formaldehyde", as used herein, is intended not only free formaldehyde and paraldehyde but also solutions and compounds which will liberate the same under the conditions specified. Various modifying agents such as plasticizers or the like may be employed if desired. Likewise the proportions of the ingredients may be varied. For example, the formaldehyde, or other methylene compounds, could be employed in amounts as high as 50% or as low as 2% and, possibly, outside this range. In general, it may be said that any equivalents or any modifications of procedure which would naturally occur to one skilled in the art may be employed without departing from the scope of my invention.

My invention now having been described, what I claim is:

1. An adhesive consisting essentially of an aqueous alcoholic solution of zein containing from 2–50% of formaldehyde and from 2–100% of acetic acid, both based on the weight of the zein.

2. An adhesive consisting essentially of a 20–35% solution of zein in aqueous alcohol containing from 2–50% of formaldehyde and 2–100% of acetic acid, both based on the weight of the zein.

3. An adhesive consisting essentially of a 20–35% solution of zein in aqueous alcohol containing from 15–25% of formaldehyde and from 2–15% of acetic acid, both based on the weight of the zein.

4. An adhesive consisting essentially of a solution of zein in concentration of approximately 20–35%, in an aqueous organic solvent mixture containing from 2–50% of formaldehyde and from 2–100% of a lower aliphatic acid, both based on the weight of the zein.

OSWALD STURKEN.